United States Patent [19]
Hancock et al.

[11] Patent Number: 5,465,118
[45] Date of Patent: Nov. 7, 1995

[54] LUMINANCE TRANSITION CODING METHOD FOR SOFTWARE MOTION VIDEO COMPRESSION/DECOMPRESSION

[75] Inventors: Steven M. Hancock; Mark A. Pietras, both of Boca Raton, Fla.

[73] Assignee: International Business Machines Corporation, Armonk, N.Y.

[21] Appl. No.: 170,044

[22] Filed: Dec. 17, 1993

[51] Int. Cl.⁶ .................................. H04N 7/26; H04N 7/28
[52] U.S. Cl. .................... 348/396; 348/392; 348/395; 348/397; 348/416; 348/419; 348/420
[58] Field of Search .................... 348/395, 396, 348/394, 397, 392, 391, 631

[56] References Cited

U.S. PATENT DOCUMENTS

| | | | |
|---|---|---|---|
| 4,673,977 | 6/1987 | Steizenmuller | 348/395 |
| 4,743,959 | 5/1988 | Frederiksen | 348/395 |
| 4,803,548 | 2/1989 | Kirk | 348/394 |
| 4,816,901 | 3/1989 | Music et al. | 348/396 |
| 4,914,508 | 4/1990 | Music et al. | 348/396 |
| 4,918,523 | 4/1990 | Simon et al. | 348/396 |
| 4,924,310 | 5/1990 | von Brandt | 348/395 |
| 4,933,761 | 6/1990 | Murakami et al. | 348/396 |
| 4,954,879 | 9/1990 | Heckt | 348/396 |
| 4,965,754 | 10/1990 | Stansfield et al. | 348/395 |
| 4,987,480 | 1/1991 | Lippman et al. | 348/396 |
| 5,045,925 | 9/1991 | Saito | 348/396 |
| 5,047,853 | 9/1991 | Hoffert et al. | 348/396 |
| 5,121,191 | 6/1992 | Cassereau et al. | 348/395 |
| 5,159,449 | 10/1992 | Allmendinger | 348/392 |
| 5,162,907 | 11/1992 | Keating et al. | 348/396 |
| 5,185,655 | 2/1993 | Wakeland | 348/392 |
| 5,220,410 | 6/1993 | Wakeland et al. | 348/396 |
| 5,255,090 | 10/1993 | Israelsen | 348/391 |
| 5,359,438 | 10/1994 | Maeda | 348/392 |

FOREIGN PATENT DOCUMENTS 62-143584  6/1987  Japan .

OTHER PUBLICATIONS

Television Engineering Handbook, K. Blair Bension, pp. 19.11–19.12.

Primary Examiner—Tommy P. Chin
Assistant Examiner—Anand Rao
Attorney, Agent, or Firm—Bruce D. Jobse; Paul E. Kudirka

[57] ABSTRACT

An digital video image processing system employs codes of various lengths to encode the luminance information within the digital video images. The inventive method and apparatus divides a video image into non-overlapping regions containing a plurality of pixels with luminance values. Within each region, the method computes the total luminance variation across the region, the direction of greatest luminance change within the region, the base, or lowest, luminance value within the region and the location and type of luminance transition within the region. Depending on the variation of the luminance values within a region and on the quality desired in the decoded image, the computed information is used to encode the luminance values in short, medium, or long codes. The luminance codes may be predetermined and unchanging or they may vary from image to image or within given images.

15 Claims, 9 Drawing Sheets

Fig. 3

|  | | | | | | | | | | | | |
|---|---|---|---|---|---|---|---|---|---|---|---|
| 27 | 28 | 30 | 31 | 32 | 32 | 32 | 32 | 32 | 32 | 32 | 32 |
| 27 | 28 | 30 | 31 | 32 | 32 | 32 | 32 | 32 | 32 | 32 | 32 |
| 27 | 28 | 30 | 31 | 32 | 32 | 32 | 63 | 63 | 32 | 32 | 32 |
| 27 | 28 | 30 | 31 | 32 | 32 | 63 | 63 | 63 | 63 | 32 | 32 |
| 25 | 27 | 30 | 31 | 32 | 32 | 63 | 63 | 63 | 63 | 32 | 32 |
| 27 | 27 | 30 | 31 | 32 | 32 | 32 | 63 | 63 | 32 | 32 | 32 |
| 28 | 28 | 30 | 31 | 32 | 32 | 32 | 32 | 32 | 32 | 32 | 32 |
| 30 | 30 | 31 | 31 | 32 | 32 | 32 | 32 | 32 | 32 | 32 | 32 |
| 30 | 30 | 31 | 31 | 31 | 31 | 31 | 31 | 31 | 31 | 31 | 31 |
| 30 | 30 | 30 | 31 | 30 | 30 | 30 | 30 | 30 | 30 | 30 | 30 |
| 30 | 30 | 30 | 30 | 29 | 29 | 29 | 29 | 29 | 29 | 29 | 29 |
| 30 | 30 | 30 | 30 | 28 | 28 | 28 | 28 | 28 | 28 | 28 | 28 |

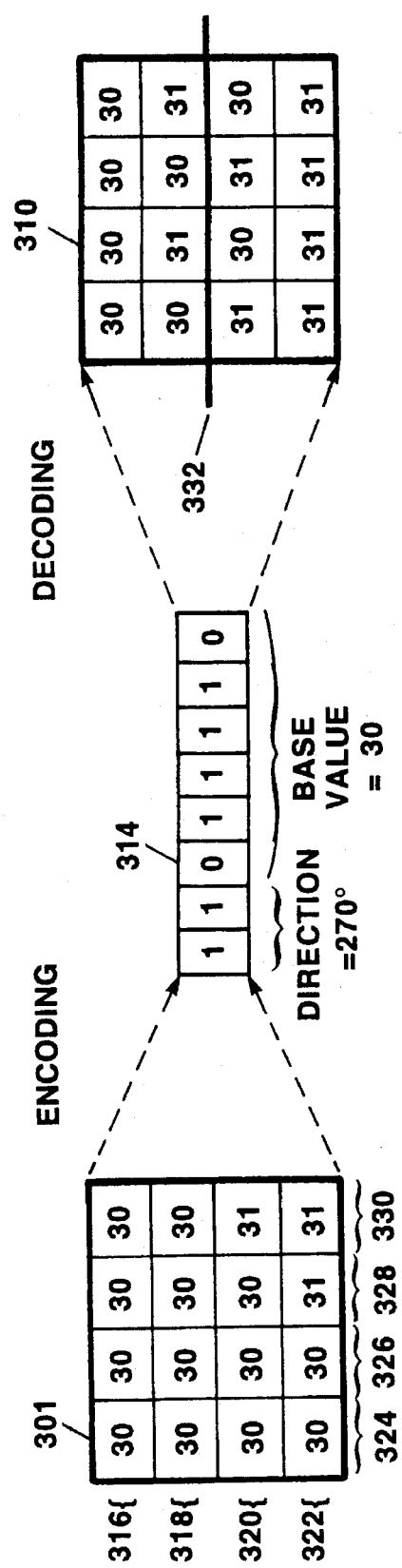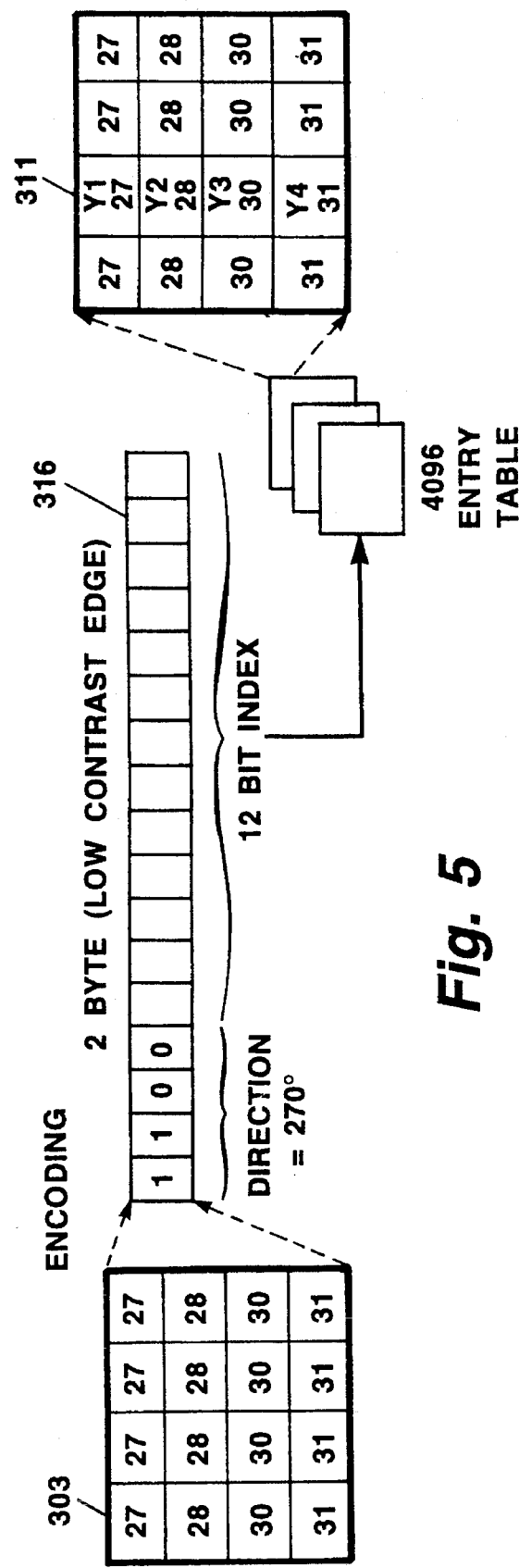

Fig. 8

LUMINANCE TRANSITION CODING METHOD FOR SOFTWARE MOTION VIDEO COMPRESSION/DECOMPRESSION

FIELD OF THE INVENTION

This invention relates generally to systems for reducing the amount of digital data required to represent digital video images. More specifically, it relates to a system for compressing the luminance information in an image. Compression is effected by eliminating redundancies within images and between sequential images and also by discarding luminance information which would be imperceptible to a human observer.

BACKGROUND OF THE INVENTION

The storage and transmission of full-color, full-motion images is increasingly in demand. These images are used, not only for entertainment, as in motion picture or television productions, but also for analytical and diagnostic tasks such as engineering analysis and medical imaging.

There are several advantages to providing these images in digital form. The images are more susceptible to enhancement and manipulation. As with all digital signals, digital video images can be regenerated accurately over several generations with only minimal signal degradation.

On the other hand, digital video requires significant memory capacity for storage and, equivalently, it requires a high-bandwidth channel for transmission. For example, a single 512 by 512 pixel gray-scale image with 256 gray levels requires more than 256,000 bytes of storage. A full color image requires nearly 800,000 bytes. Natural-looking motion requires that images be updated at least 30 times per second. A transmission channel for natural-looking full color moving images must therefore accommodate approximately 190 million bits per second. One minute of full color video requires almost 2 gigabytes of storage.

As a result, a number of image compression techniques have been proposed to reduce the information capacity required for storage and transmission of digital video signals. These techniques generally take advantage of the considerable redundancy in any natural image and the limits of the human psycho-visual system which does not respond to abrupt time-based or spatial transitions. Both time-domain and spatial-domain techniques are used to reduce the amount of data used to transmit, record, and reproduce color digital video images.

For example, differential pulse-code modulation (DPCM) is a commonly-used compression technique which relies upon the facts that video images, generally, are quite redundant and that any transitions in the images are, for the most part, gradual. A DPCM encoder predicts each pixel value from previous pixel values. It then compares the actual value with the predicted value to obtain an error signal. The error is the encoded value. If the predictions are relatively accurate, the error will be small and its value will occupy a great deal less memory and/or bandwidth than the original video signal. The signal can be decoded by using the prediction algorithm in conjunction with the error signal.

A color image may be represented as a combination of luminance and color-difference signals. For example, a digitized color image may have one byte assigned for the color difference signal for each pixel. This image information may be compressed by recognizing that the human psycho-visual system is limited in its ability to detect subtle variations in color and therefore assigning a single chrominance value to a group of neighboring pixels which are of approximately the same color.

A digitized image's luminance information can also be encoded for compression, but, because the human psycho-visual system is more sensitive to luminance changes than to color changes, greater care must be taken in reducing luminance information. A number of the advantages of digital television, in addition to a number of data compression techniques, are discussed in chapters 18 and 19 of "Television Engineering Handbook", K Blair Benson, Editor in Chief, McGraw-Hill Book Company, 1986 which is hereby incorporated by reference.

A commonly-employed method of luminance reduction is block truncation coding. This technique entails dividing an image into contiguous, non-overlapping regions, then encoding the luminance of each of the regions using two luminance values and a bit mask. The bit mask indicates which of two luminance values is to be assigned to a particular pixel within the region. If the regions are too large, the image takes on a "contoured" look, thus degrading the image quality. On the other hand, if the regions are too small, very little image compression is achieved.

It is therefore an object of the invention to reduce the data required to represent the luminance information of an image which is represented in a luminance and color-difference format. It is a further object of the invention to improve the quality of a compressed image. A further object of the invention is to improve the degree of compression that can be achieved for a given level of image quality. A still further object of the invention is to permit interactive tradeoffs between the degree of compression and the quality of an image.

SUMMARY OF THE INVENTION

The invention compresses the luminance information contained within a digital color image by dividing the image into non-overlapping regions and encoding the luminance information within each region in accordance with the direction, degree, and location of luminance transitions within the region. After initial encoding, the regions' compression ratio and image quality, which could be measured, for example, by computing the difference between the original luminance values and the encoded luminance values, are compared against preset standards and compromises are made, where necessary, in satisfying these two competing objectives.

The comparison of image quality and compression ratio may be under direct control of the system's application program or the system may accommodate operator intervention in order to make adjustments based on "the look" of a decoded image.

Encoding is accomplished by calculating the degree of luminance change within a region, the direction of greatest change, and by determining the type and location of any luminance transitions within the region. More specifically, the transitions are characterized on the basis of whether they are high-contrast, low-contrast (i.e. smooth), or linear transitions across the region. If the transition is a high or low contrast transition, a location defining the transition is assigned. The region is then encoded, based upon the above information, as a one-byte or multiple-byte code. Each code provides, when decoded, a luminance distribution which approximates luminance distributions commonly found in naturally occurring images.

For example, a four pixel by four pixel region may vary in luminance by only one luminance level, or step. The region could be encoded in one byte which contains a base luminance value and direction information which indicates the direction in which the luminance increases. In another example, a four pixel by four pixel region may exhibit a twenty-step increase in luminance three quarters of the way from the top of the region. The invention could encode the direction of luminance change, the base luminance value of the region, the degree of luminance change within the region, and a function which indicates the type, high-contrast, and location, three quarters from the top, of the transition in a two-byte code.

Additionally, the codes which are used to represent luminance values may be the same throughout an entire video sequence, they may change from frame to frame, or they may even change within a frame in order to achieve greater image compression and/or image quality. An indication of which set of codes is being used is inserted into the data stream which comprises the digital image information.

BRIEF DESCRIPTION OF THE DRAWINGS

The above and further advantages of the invention may be better understood by referring to the following description in conjunction with the accompanying drawings, in which:

FIG. 3 depicts the luminance values of an image which has been divided into regions according to a practice of the invention.

FIG. 4 includes region 301 of FIG. 3, a one-byte code which encodes the luminance values of region 301, and a region, 310, which results from decoding the one-byte code.

FIG. 5 includes region 303 of FIG. 3, a two-byte code which encodes the luminance values of region 303, and a region, 311, which results from decoding the two-byte code.

FIG. 8 includes region 302 of FIG. 3, a four-byte code which encodes the luminance values of region 302 and a region, 315, which results from decoding the four-byte code.

DETAILED DESCRIPTION OF ILLUSTRATIVE EMBODIMENTS

Figure 1:
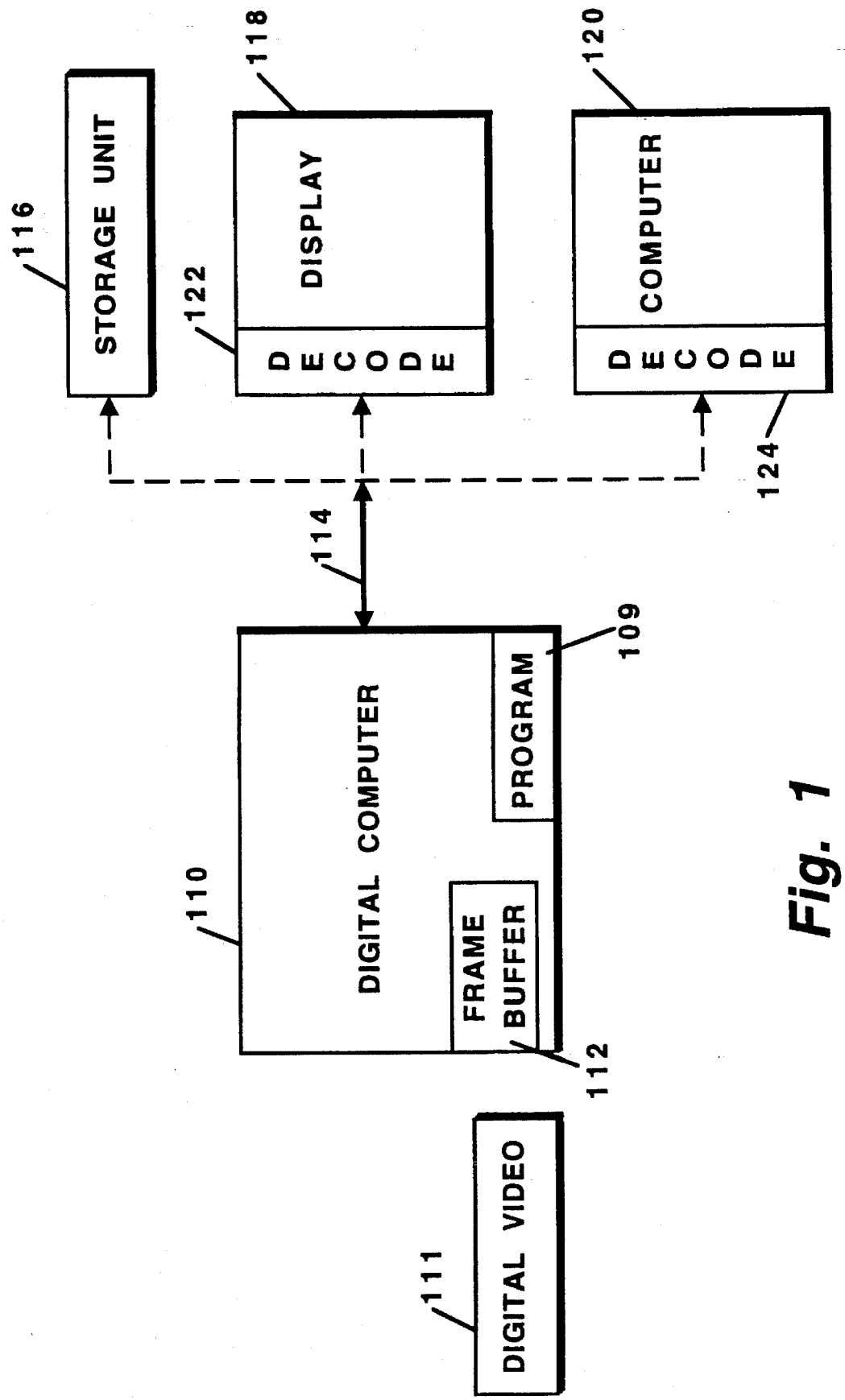
FIG. 1 is a block diagram of the invention in use with digital video storage and communications equipment.

In FIG. 1 we have illustrated the use of the invention with a digitized video signal. A general purpose computer 110 operates under control of an applications program 109 which directs it to, inter alia, encode digital video information received from stored digital video source 111 and transfer the encoded information through communication path 114 to other devices such as storage device 116, a video display 118, and a computer 120. The video display 118 also incorporates a decoder 122 by which it may accept video information encoded according to the invention, decode it, and display it. The computer 120 also employs a decoder 124 to display video information encoded according to the invention. The storage unit 116 stores encoded video information for later retrieval by the digital computer 110, the display 118, or the computer 120.

The frame buffer 112, which may be physically located within the computer 110, holds a digitized video image which is represented in a luminance/chrominance format provided by digital video source 111. The computer 110 has random access to the information contained in the frame buffer 112, while encoding the digitized video information contained therein.

The digital-video related information transferred along the path 114 is encoded by the computer 110 under control of the program 109 to reduce the data capacity required for accurate reproduction of the video signal. Therefore the transmission path 114 will be of a lower bandwidth capacity than would be required if the video information were not encoded. Further, the large-scale storage device 116 is of lower capacity than would be required for non-encoded video information storage. The display 118, which receives the encoded video information, employs a decoder 122 to convert the encoded video information into a format for display. Similarly, the computer 120 may employ a decoder 124 to convert the video information into a format for display.

Figure 2A:
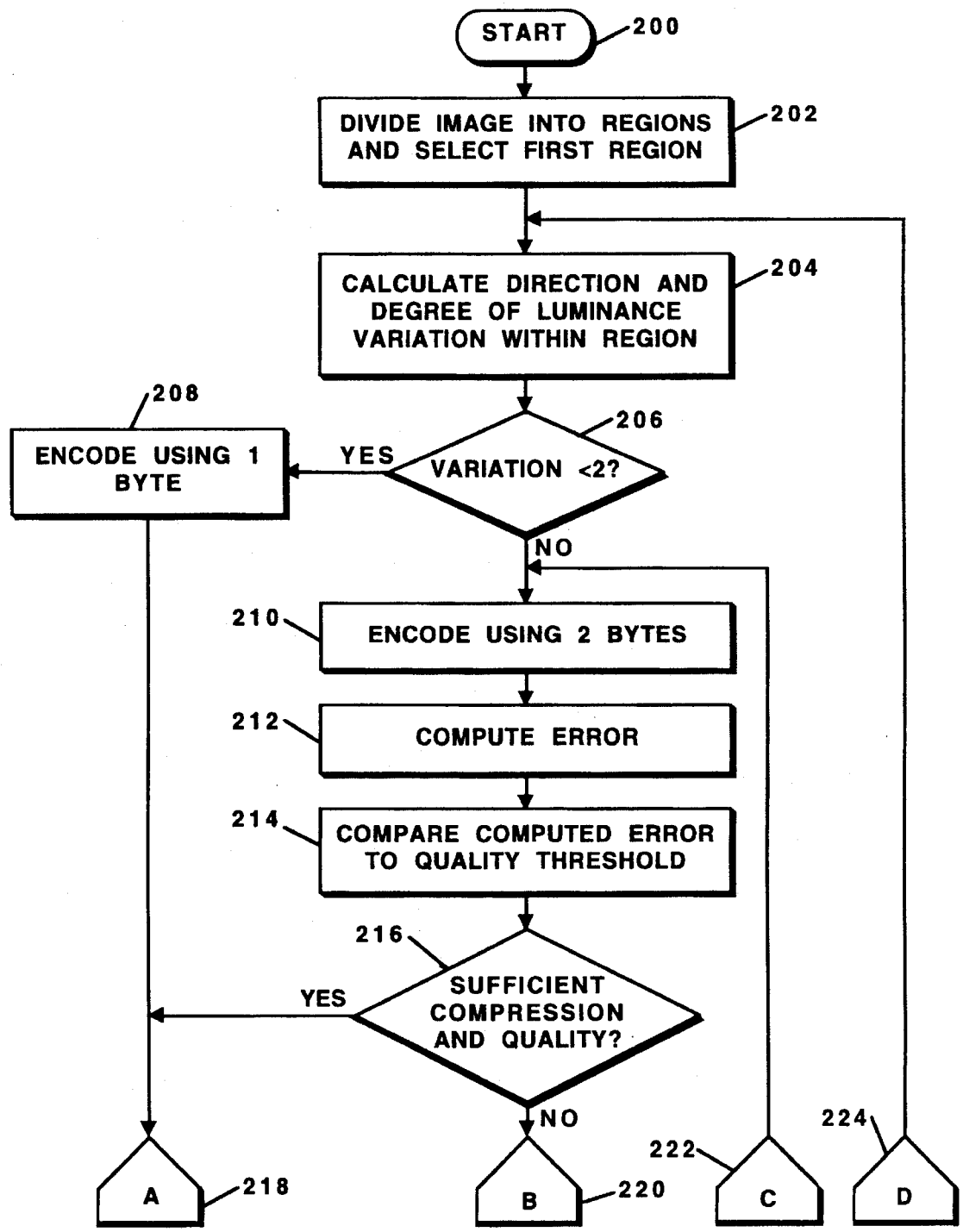
FIGS. 2A and 2B, when placed together, form a flow chart providing an overview of the invention's encoding process.
Figure 2B:
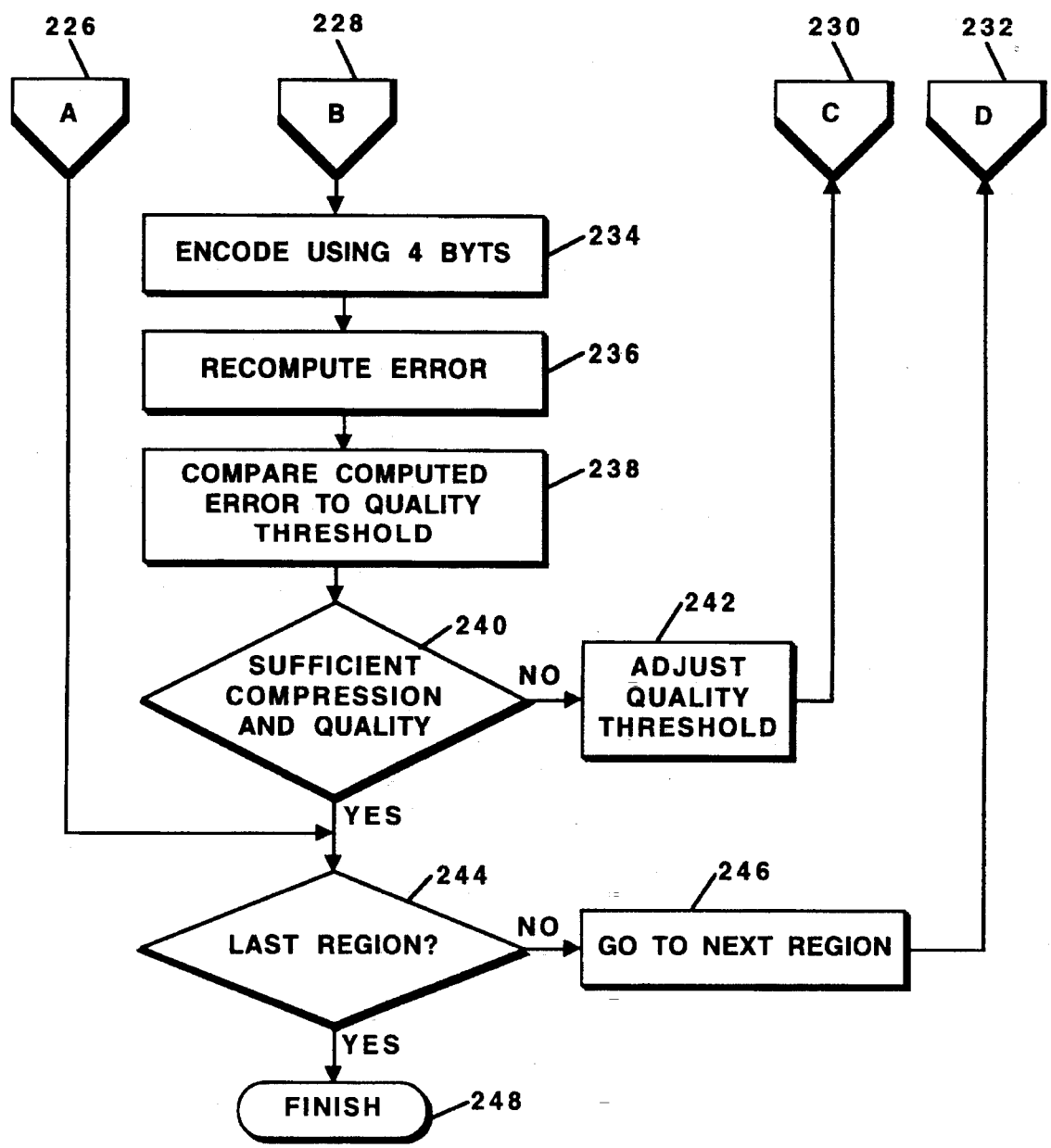

The flow chart of FIGS. 2A and 2B discloses generally the operation of an illustrative luminance encoder which can be effected by the computer 110 under control of the program 109 or may be effected by special purpose hardware. Operation begins at step 200 and proceeds to step 202 where the image stored within the frame buffer 112 is divided into non-overlapping regions. Illustratively, square contiguous regions are used, but non-contiguous regions and regions of shapes other than square may also be used. More particularly, in accordance with a conventional frame buffer operation, the digital image may be stored in a multi-slot array, each slot of which corresponds to a picture element (pixel) to be displayed. Each slot contains a byte (eight bits), encoding the luminance information associated with the pixel.

The computer 110 divides the image into regions by selecting groups of slots, each group of slots corresponding to an image region of several contiguous pixels. In accordance with one embodiment of the invention, each region is a square region of four pixels by four pixels, each pixel having a byte of luminance information associated with it. After dividing the image into regions the computer selects a first region to compress, then proceeds to step 204.

At step 204, the computer calculates a base luminance value, a direction and degree of greatest luminance variation, and a location and type of any luminance transition which occurs within the region being compressed. These calculations are discussed in more detail in connection with FIGS. 4–8 below and, for this illustrative embodiment, the base luminance value is deemed to be the lowest luminance value found along the periphery of the region. The direction of greatest luminance variation is measured in degrees around a circle having a center at the center of the region and the 90 degree direction is taken arbitrarily to be towards the top of the image. The degree of luminance variation is calculated by determining the highest luminance value found along the periphery of the region and subtracting the base luminance value. A region within which there is no luminance variation is considered to be the same as a region where the luminance variation direction is zero degrees.

At step 206, the computer determines whether the degree of greatest luminance variation or the total variation in luminance across the region is less than, in this exemplary embodiment, two luminance levels. If the variation is less than two luminance levels, the computer moves to step 208 where it encodes the luminance values within the region using a one-byte code in the manner shown in FIG. 4 below. The computer then moves, via off-page connectors 218 and 226 to step 244 where it ascertains whether there are more regions to process within the image. If there are more regions to process, the computer moves to step 246, where it selects the next region and returns, via off-page connectors 232 and 224, to step 204, proceeding in this manner until the entire image is processed. If, at step 244, the computer determines that there are no more regions to process, it progresses to step 248, the end of the encoding process.

Returning to the decision at step 206, if the total luminance variation across the region was not less than the exemplary two luminance levels, the computer progresses to step 210 and encodes the luminance values within the region using a two-byte code in the manner shown in FIG. 5 below.

After encoding the region in two bytes, the computer computes the luminance error for the region at step 212. The luminance error is computed by decoding the two byte code to generate luminance values for the region, then comparing those generated luminance values to the original luminance values for the region to generate a number of difference values and summing the difference values.

In step 214, the computed error is compared to a predetermined quality threshold to determine if the two byte encoding produces sufficient quality. Using the comparison in step 214, the illustrated routine determines, in step 216, whether sufficient compression has been attained while maintaining image quality standards. If compression and quality standards for the region have been met, the invention proceeds, via off-page connectors 218 and 226, to step 244 and further processes the image as previously described. The comparison of step 216 could involve operator intervention. That is, thresholds may be set and modified by an operator who views a decoded image and adjusts compression and quality thresholds as necessary.

Figure 8:
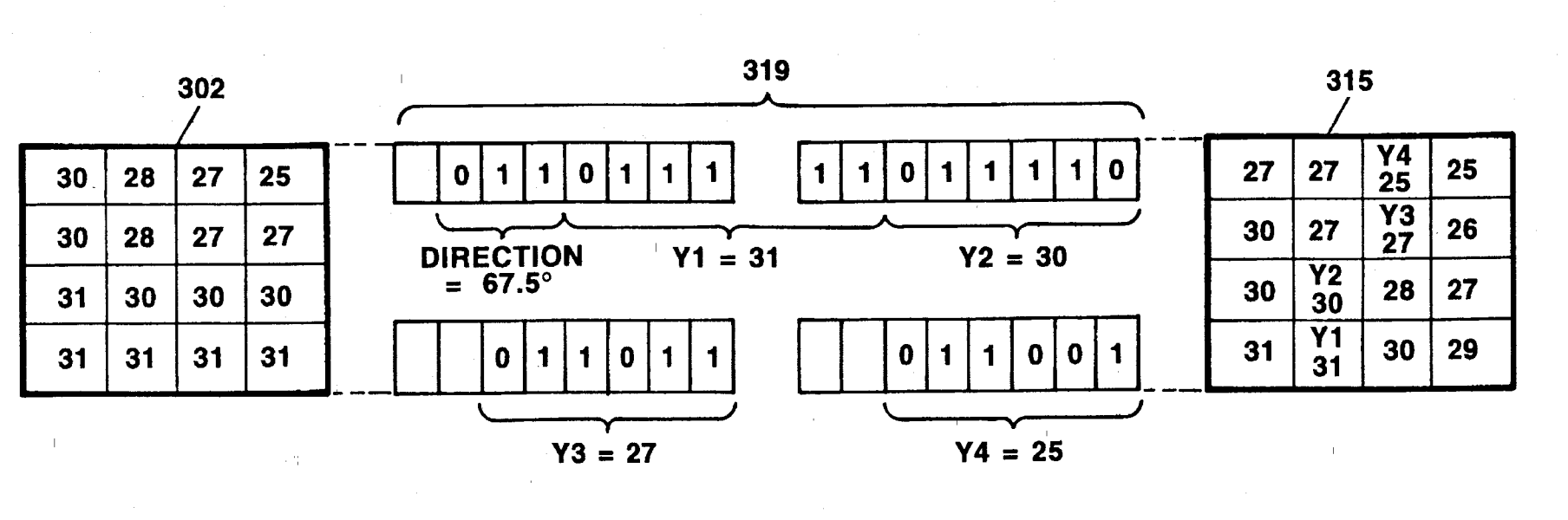

If sufficient compression and quality standards have not been maintained as determined in step 216, the computer proceeds, via off-page connectors 220 and 228, to step 234, where the region is re-encoded using four bytes as shown in FIG. 8 below. In step 236, the error is recalculated as described above and compared to the predetermined quality threshold in step 238. At step 240, again with the possibility of operator invention, the region is judged based upon compression and quality standards. If the standards are not met, the computer proceeds to step 242 where adjustments are made to the predetermined quality threshold in order to allow a greater error threshold. Then, the routine returns, via off-page connectors 230 and 222, to step 210. The computer does not proceed through this loop endlessly; since the quality thresholds are being relaxed, at some point it declares the region to be of sufficient quality and compression and proceeds, as before, to step 244.

To aid in a further understanding of the invention, a more detailed description of the operation of one embodiment of the invention will be set forth in connection with FIG. 3 which depicts a portion of a video display 300. In operation, the inventive routine may divide the image into non-overlapping four pixel by four pixel regions 301, 302, 303, 304, 305, 306, 307, 308, and 309. Each pixel within the image has associated with it a luminance value which can range from zero to sixty-three. These values would actually be stored in binary form within the computer memory, but, in FIG. 3, for clarity, these values are given decimal numbers. Each region, 301–309, within the image has associated with it a different illustrative total luminance variation across the region.

After subdividing the image in the manner displayed in FIG. 3, the invention proceeds, as described below in detail, to calculate the base luminance, direction, degree and type of luminance variation within each of the regions. For example, region 301 has a base luminance value of 30 (the lowest luminance value around the periphery). Around the periphery the luminance values vary from the base value of 30 to a high value of 31, resulting in a degree of luminance variation of one.

The direction of luminance change can be calculated in any one of several ways. One illustrative way is to assume a trial direction of luminance variation, calculate a set of average luminance values based on that assumed direction and determine a direction error value by subtracting the average luminance values from the actual luminance values and summing the resulting differences. Another trial variation direction is assumed and the direction error value is calculated. After a set of direction error values has been calculated for different trial directions, the trial direction with the lowest direction error value is chosen as the luminance variation direction.

FIG. 4 illustrates in more detail the calculation of the luminance variation direction and the final encoding of the luminance information. As previously mentioned, a number of trial directions are assumed and direction error values are calculated. In the present illustrative embodiment, sixteen trial directions are used corresponding to angle increments of 22.5° (0°, 22.5°, 45°, 67.5°, 90°, 112.5°, 135°, 157.5°, 180°, 202.5°, 225°, 247.5°, 270°, 292.5°, 315° and 337.5°). For each trial direction, the luminance values of lines of pixels perpendicular to the direction are averaged to form an average luminance value. For example, assume a trial direction of 0° (a horizontal direction extending to the right). In this case, vertical columns of luminance values are averaged to get the average luminance value. In particular, the luminance values in column 324 are averaged to obtain a first average luminance value of 30. The averaging process is repeated for the luminance values in columns 326, 328 and 330 to obtain average luminance values of 30, 30.25 and 30.5, respectively.

Next, for each column the average luminance value for that column is subtracted from each actual luminance value to get a set of partial direction error values. A final direction error value for the trial direction is calculated by adding all of the partial error values.

A new trial direction is assumed and a new direction error value is calculated. For example, assuming a trial direction of 270°, the luminance values in rows 316, 318, 320 and 322 would be averaged, subtracted from the actual values and the differences summed to get a second direction error value. Although sixteen angles are used, calculations are actually made for only eight angles and the remaining error values determined by noting the direction of luminance increase (increasing towards the top or towards the bottom and towards the left or towards the right).

After direction error values are obtained for all sixteen trial directions, the trial direction with the lowest error value is chosen as the luminance variation direction. In the luminance value region 301, this luminance variation direction would correspond to a direction of 315° (towards the lower right-hand corner).

Because the luminance variation over the entire region 301 is less than two luminance steps, the luminance value for the region is encoded in one byte 314 in accordance with step 208 (FIG. 2). More particularly, two bits of the one-byte code 314 are used to specify the angle of greatest luminance variation. These two bits yield four combinations and consequently, only four directions can be specified. Further, since the 0° direction is used to indicate that there is no luminance variation across the region, only three actual directions can be specified. These directions are spread equally, for example, resulting in directions of 45°, 135° and 270°. More specifically, an illustrative two bit code is as follows: 00 indicates that there is no change in luminance in the block, 01 indicates that the angle of greatest luminance variation is 45°, 10 indicates that the angle of greatest luminance variation is 135° and 11, as illustrated in this example, indicates that the angle of greatest luminance variation is 270°. Other coding schemes could be used instead without affecting the operation of the invention. In region 301, as noted above, the calculated luminance variation direction is actually 315°. In order to encode this value, the closest (270°) of the three available values is used as an approximation to the actual calculated value.

The remaining six bits of the one-byte code 314 indicate the base, or lowest, value of luminance within the region. Six bits affords 64 levels of luminance variation. Because all regions encoded with one byte exhibit no more than one step in luminance variation, the decoding process merely requires the base value and direction of change found in the encoded byte 314.

The decoded region, 310 (FIG. 4), illustrates a reconstructed region of luminance values that result from decoding the one-byte code 314 in accordance with an illustrative decoding scheme described below. Because the encoded luminance variation direction, 270°, is an approximation to the actual calculated direction, errors may be introduced as evident in the lower left hand corner of the region 310. These errors, however, are imperceptible in a displayed image, as the luminance variation is small. Also, in the preferred embodiment, luminance values are assigned, while decoding, in a manner which distributes the variation in luminance. This distribution, an error distribution density pattern, has the effect of "smoothing" transitions and making them appear more like transitions which occur in naturally-occurring images.

More particularly, a line 332 is established through the region center perpendicular to the encoded direction. One way to assign luminance values would be to assign all pixels above this line the base luminance value (30) and all pixels below the line with the highest luminance value (31). However, in accordance with a preferred embodiment of the invention, luminance values of both the base value and the high value are alternately assigned along the line 332 to smooth the distribution. Other smoothing schemes can also be employed.

The one-byte encoding illustrated in FIG. 4 provides the greatest degree of compression. In this illustrative embodiment, sixteen luminance values which, without coding, would consume sixteen luminance bytes are encoded into one byte, yielding a 16 to 1 compression ratio. Fortunately, many regions within a natural image exhibit the same, or very nearly the same, luminance value. Consequently, one-byte encoding can be used for a high percentage of the regions within an image.

However, some image areas have larger luminance changes than can be accommodated by one-byte coding and must be encoded using additional bytes. FIG. 5 illustrates another example of the illustrative encoding scheme and displays sample region 303 of FIG. 3. Since the luminance variation over the region 303 is greater than two luminance steps, the region 303 is not encoded in one byte, but rather it is first encoded with two bytes (16 bits) in accordance with step 210 (FIG. 2). The two-byte code 316 and region 311 which is a reconstruction of the region 303 luminance distribution obtained by decoding the two-byte code 316 are also shown in FIG. 5. In accordance with the discussion above, the base luminance value of region 303 is 27 and the region exhibits a luminance variation direction of 270° and the degree of variation is four luminance levels.

Two-byte encoding devotes four bits to angular information, thus permitting 16 trial directions in angle increments of 22.5°. The remaining 12 bits within a two-byte code produce an index, or pointer, to one entry in a 4,096 entry array. Each entry of this array is a four-byte code, where the four bytes of each entry entries are denoted as Y1, Y2, Y3 and Y4. The entries within this array are chosen to produce luminance distributions which closely approximate naturally occurring luminance distributions. These entries, as noted in the summary of the invention, may be predetermined, or static. They may be modified between frames, or modified within a frame and may be determined empirically.

The two-byte coding scheme constructs a twelve-bit index from six bits corresponding to the base luminance information, six bits of luminance variation degree information and information regarding one of seven possible luminance transition functions which indicate how the luminance values change from the base luminance values to the high luminance values starting at the base luminance values and proceeding in the luminance variation direction across the region. An illustrative routine which illustrates the mapping of each valid combination of the base luminance, variation degree and transition function is shown in detail in FIGS. 9A and 9B discussed below.

Seven exemplary luminance transition functions are: (0) linear change across the region, (1) low contrast (slow change) transition occurring at one quarter of the way across the region, (2) low contrast transition at one half across the region, (3) low contrast transition at three quarters across the region, (4) high contrast (fast change) transition at one quarter across the region, (5) high contrast transition at one half across the region, and (6) high contrast transition at three quarters across the region. The linear transition function describes a region where the luminance level increases at a constant rate across the region. Each of the three low contrast functions describe a region when the changing luminance is not instantaneous but is analogous to a blurry transition on the video display. Each of the three high contrast transition functions correspond to an instantaneous change in luminance, which displays as a sharp, well-defined edge.

During the encoding process, the angle of luminance variation increase is determined in the same manner as the one-byte case and encoded using the four direction bits. In order to map the required information into the index, each of the seven transition functions is assigned a predetermined set of permissible total luminance variations. That is, for each luminance transition function, only members of the assigned set of the possible total luminance variations across the region are used to compute index numbers for accessing the luminance distribution array. More particularly, in accordance with one illustrative embodiment, for the linear transition function, the permissible set of total luminance variations across a region includes variations of 2, 3, 4, 5, 6, 7, 8, 11, 14, 17 and 20 luminance levels. For low contrast edge functions, total luminance transitions of 4, 5, 6, 7, 8, 11, 14, 17, 20, 23, 26, 29, 32 and 36 luminance levels are permitted. For high contrast edge transitions functions, total luminance transitions of 6, 8, 11, 14, 17, 20, 23, 26, 29, 32, 35, 40 and 46 luminance levels are permitted. Linear transitions with a total luminance variation of 4 are equivalent to low contrast edge transitions with a total luminance variation of 4 and are not duplicated in the array. Some combinations of base luminance values and permissible transitions are invalid. For example, the high luminance values which result from adding the luminance variation to the base luminance value must be equal or less than the maximum permissible luminance value (63). When the invalid combinations are eliminated, there are 4096 remaining values which can be encoded by twelve bits into 4096 consecutive indices using the routine illustrated in FIGS. 9A and 9B.

In order to generate the index value during the encoding process, each of the transition functions is assigned a function number ranging from zero to six as noted above. A set of four average luminance values are generated, with each average luminance value comprising the average of the luminance values of a line of pixels which extends perpendicular to the encoded direction. A twelve bit index value is generated by adding the base luminance value to the total luminance variation across the region, adding the first function number (0) to the resulting sum and binary encoding the resulting number. Four bytes are retrieved from the 4096 entry array using the generated index value and the retrieved bytes are subtracted from the corresponding average values previously generated to generate a set of partial errors. The partial errors are then summed to generate a first luminance error. A new twelve bit index value is generated by adding the base luminance value to the total luminance variation across the region and adding the second function number (1) to the resulting sum. Using this new number, a new four byte set is retrieved from the 4096 entry array and a second luminance error value is calculated. The process is repeated for each of the remaining function number (3–6) to generate seven luminance error values. The index value which generated the lowest luminance error value is then selected for the encoding process.

Region 303 as shown in FIG. 5 comprises a two-byte low-to-high transition which occurs half way across the region 303 and would correspond to a visual display of a low contrast edge. As illustrated in FIG. 5, the invention decodes the two-byte code, such as code 316, by first stripping off the four bits of direction information then using the remaining twelve bits as an index to retrieve a four-byte luminance distribution from the array.

The four bytes retrieved from the array (Y1, Y2, Y3, Y4) are a representative distribution of luminance values along a line in the luminance variation direction indicated by the encoded direction bits. The remainder of the luminance bytes are filled in using a conventional statistical pattern or another pattern. A preferred embodiment of the inventive decoding routine uses the four-bit direction information and the four bytes of luminance values from the array to generate the 16 luminance values which comprise a region. For angles that are even multiples of 90 degrees, the four luminance values are simply "swept through" the region in a direction perpendicular to the direction of luminance variation (see FIG. 6 for example). For intermediate angles the four luminance values are "swept through" in a similar manner, but, for these angles, there are additional locations which are not directly perpendicular to the direction of luminance variation. The luminance values for these locations are simply interpolated between the values in those bordering locations which are perpendicular to the direction of luminance variation.

An illustrative decoded region 311 for the region 303 is illustrated in FIG. 5. The four retrieved bytes are shown placed along the direction line. The luminance distribution of the region 303 exhibits a low-to-high luminance value transition at the half-way point of the region and the decoded region, 311, preserves this transition.

Figure 6:
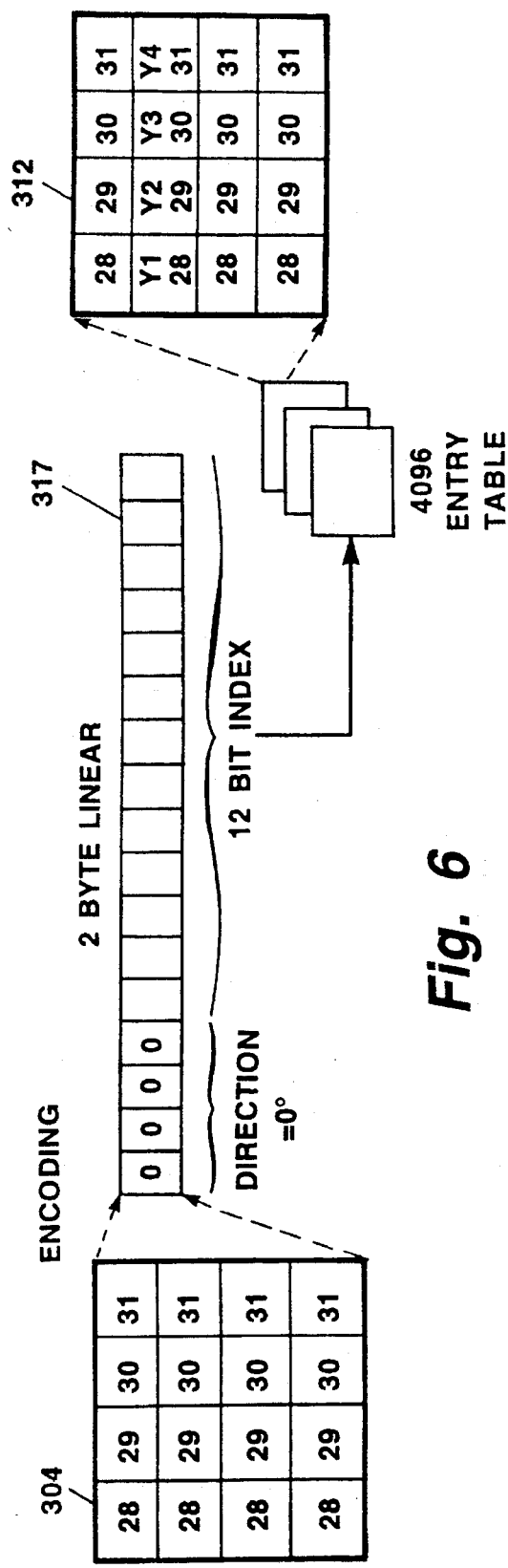
FIG. 6 includes region 304 of FIG. 3, a two-byte code which encodes the luminance values of region 304, and a region, 312, which results from decoding the two-byte code.

Similar to FIG. 5, FIG. 6 illustrates region 304 of FIG. 3, its corresponding two-byte encoding 317, and the region 312 which is a reconstruction of the region 304 luminance distribution obtained by decoding the two-byte code 317. The four encoded direction bits indicate that the direction of increasing luminance is 0° and the twelve bit index points to an array entry corresponding to a linear luminance transition across the region. The array index reflects the fact that the base luminance is 27 and the total luminance variation across the region 304 changes by three, a transition value which corresponds to a linear transition function.

Figure 7:
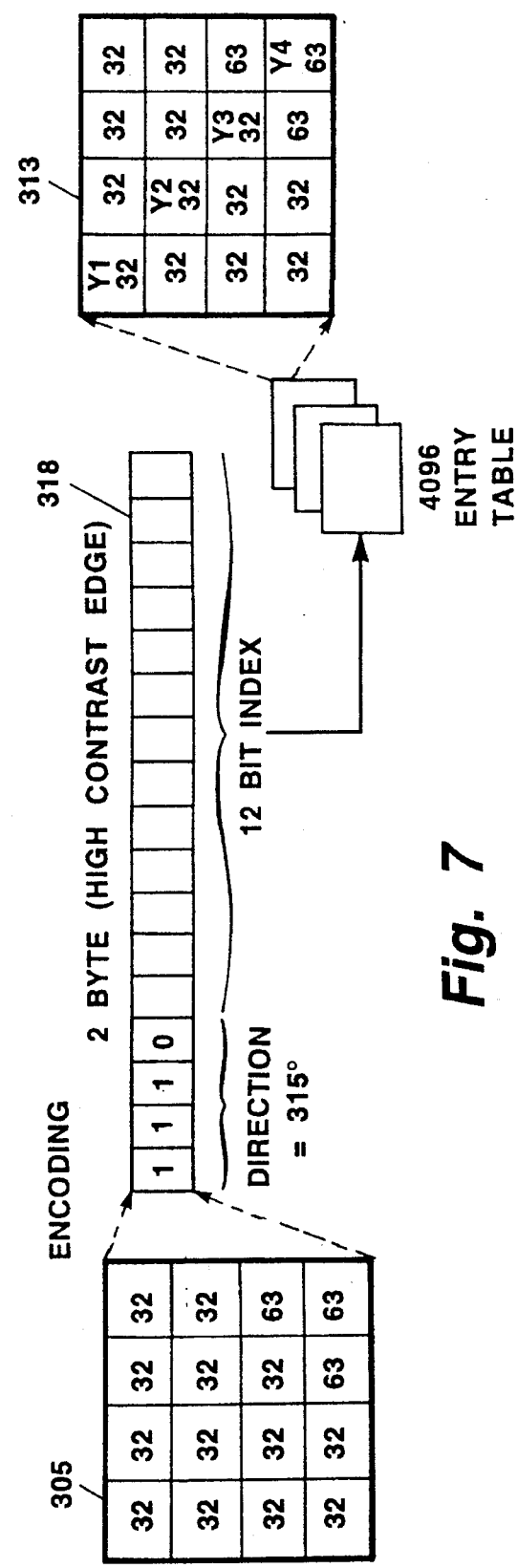
FIG. 7 includes region 305 of FIG. 3, a two-byte code which encodes the luminance values of region 305, and a region, 313, which results from decoding the two-byte code.

FIG. 7 illustrates region 305 of FIG. 3, its related two-byte code 318, and the region 313 which is a reconstruction of the region 305 luminance distribution obtained by decoding the two-byte code 318. The direction of increasing luminance is 315°, as indicated by the four direction bits. The 12-bit index points to an array entry which reflects a low-to-high transition occurring at a point along the 315° direction that is three quarters of the way across the region. Contrary to the region 303 in FIG. 5, in region 305, the transition is from luminance level 32 to luminance level 63 and would display as a high contrast edge in the lower right corner of the region 305.

Two-byte encoding, as illustrated in FIGS. 5, 6 and 7 provides a close fit to luminance transitions within regions of many natural images. The four-bits of angular information, as noted above, provide 16 steps of 22.5 degrees each. The remaining 12 bits within the two bytes map the 64-level base luminance value, the 64-level variation degree luminance value, and the luminance transition function into one of 4,096 array entries.

FIG. 8 illustrates region 302 of FIG. 3. Because region 302 does not exhibit increasing luminance in a single direction, it cannot be easily encoded using the two-byte scheme previously discussed because the index assumes that the luminance increases in a single direction. Consequently, it may be necessary to encode it with four bytes. The decision to use four-byte encoding would be made after two-byte encoding yields a luminance error figure which is unacceptable as determined in step 216 (FIG. 2). The four bytes, 319, which encode region 302 are illustrated in the center of FIG. 8. One byte indicates, in three of its bits, one of eight directions along which the four subsequent luminance values will be placed. The remainder of the first byte and the following three bytes have distributed among them the four luminance values (Y1, Y2, Y3 and Y4). The direction of the luminance variation increase is determined in the same manner as the one-byte and two-byte cases. Each of the four luminance values, Y1, Y2, Y3 and Y4, is determined by averaging the luminance values of a line of pixels which line extends perpendicular to the selected direction.

The four-byte encoded luminance information is decoded in a manner similar to the two-byte encoding scheme discussed above. For example, the four decoded luminance bytes (Y1, Y2, Y3 and Y4) are placed along the luminance variation direction indicated by the decoded direction bits (67.5°) as indicated in the decoded region 315. The remaining other locations within the region 315 are filled in as illustrated, using a predetermined error density diffusion pattern to provide a good approximation to the original luminance distribution or by the methods discussed above with respect to the two-byte coding scheme.

Figure 9A:
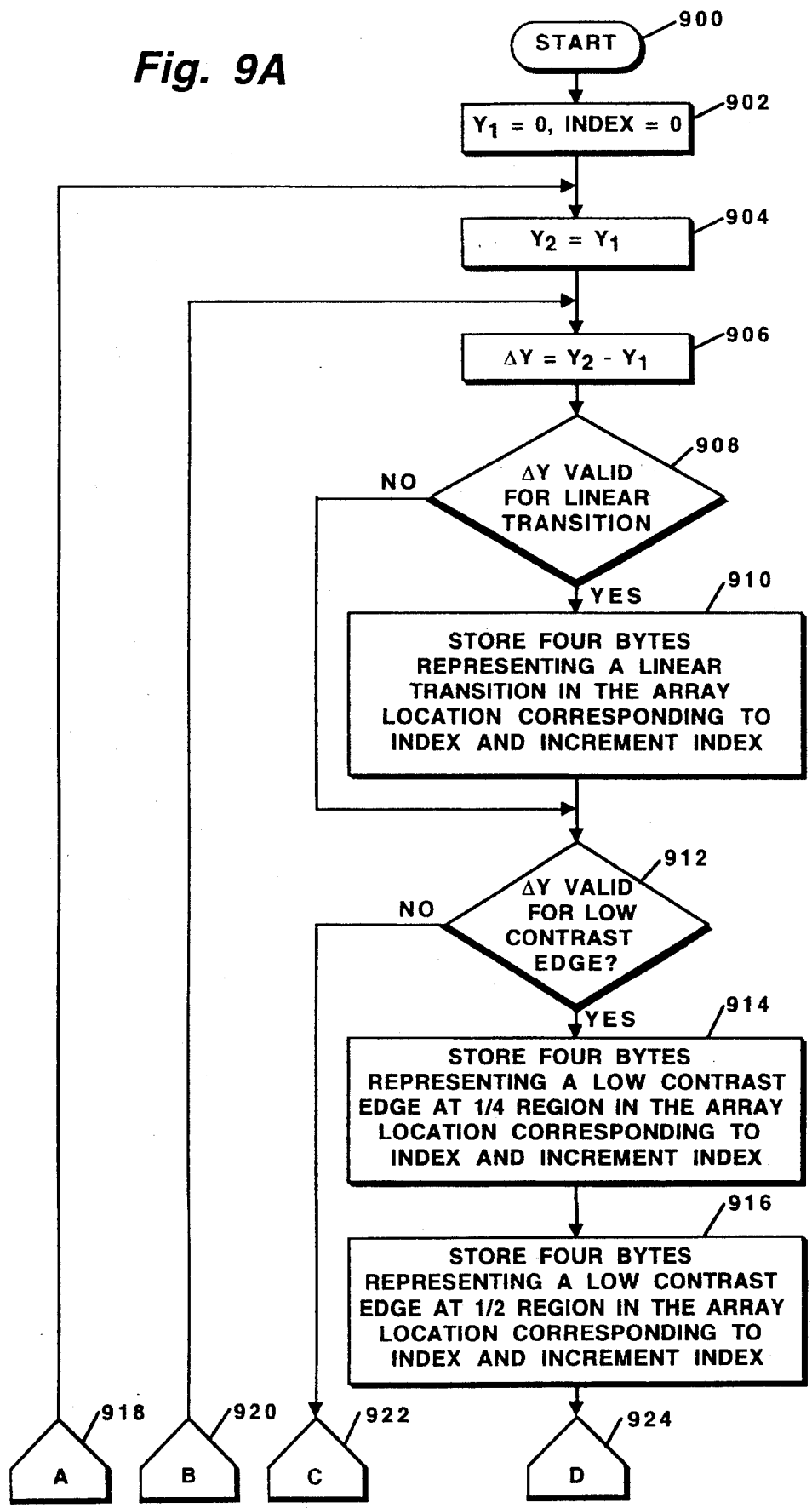
FIGS. 9A and 9B, when placed together form a flow chart of the index assignment process which associates an index value with each valid combination of luminance, change in luminance, and transition function.
Figure 9B:
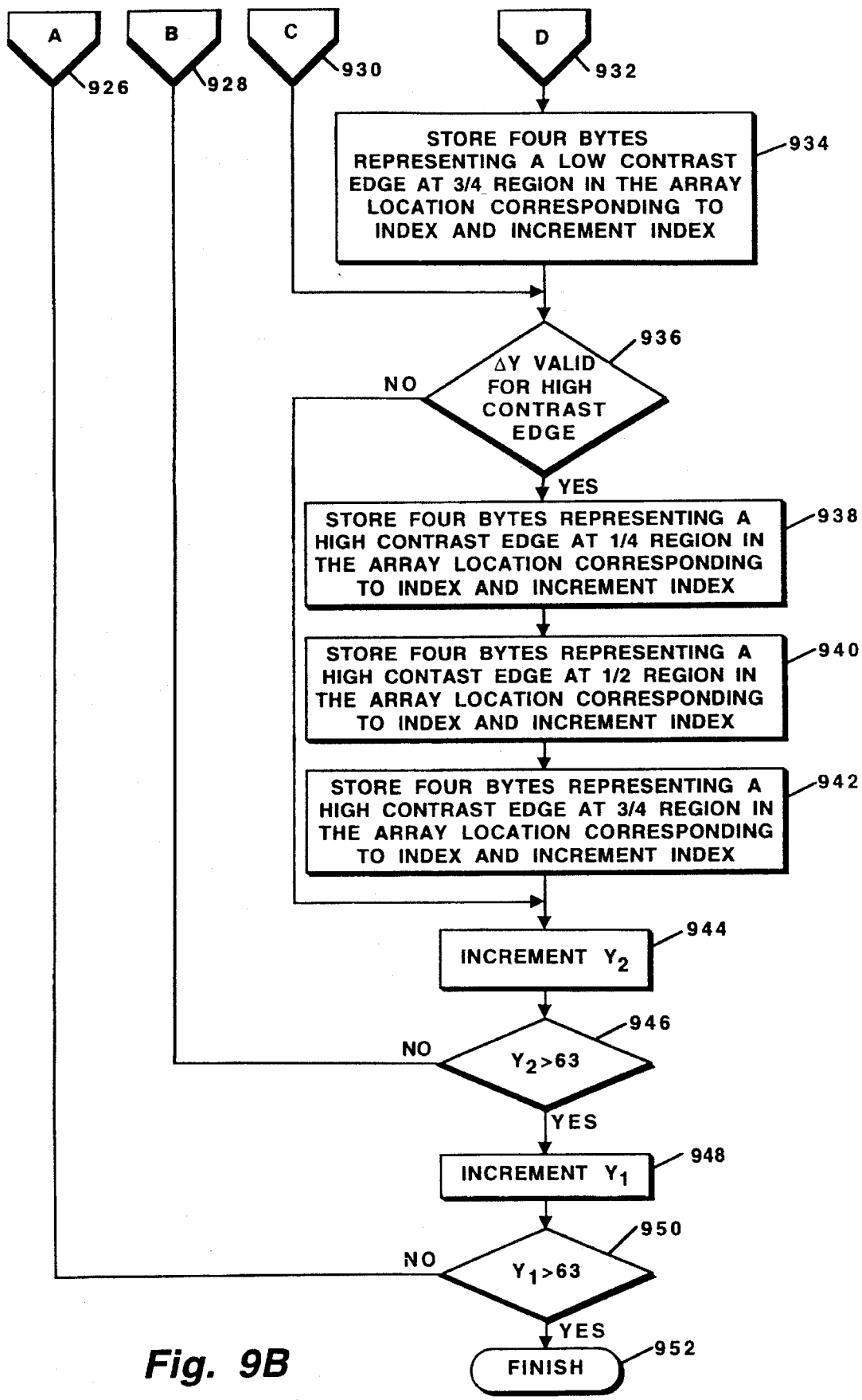

An illustrative routine suitable for the construction of the 4096 entry array from the base luminance value, the luminance variation and the luminance transition function number is illustrated in the flow chart of FIGS. 9A and 9B. The array construction begins at step 900 and, at step 902, a variable, Y1, which will be used to hold a base luminance value and a variable, Index, which is used to hold the index value are initialized to zero. At step 904, a variable Y2, which represents the high luminance value, is set equal to variable Y1. At step 906, a variable, Ay, which corresponds to the change in luminance across a region, is set equal to the difference between variables Y2 and Y1.

At step 908 ΔY is analyzed to determine whether it is one of the permissible transitions for a linear transition function. This analysis is done by comparing the value of ΔY to one of the permissible linear transition values discussed above. If ΔY constitutes a permissible linear transition value, the construction process proceeds to step 910 where a set of four bytes representing a linear luminance transition for the base luminance value Y1 and the luminance variation ΔY is stored at the array location indexed by the current index value. The current index value is then incremented and the routine proceeds to step 912.

If, in step 910, the ΔY value is not a valid transition for linear transition functions the routine skips step 910 and proceeds directly to step 912. At step 912, the Ay value is analyzed to determine whether is it valid for a low contrast edge. If it is the routine proceeds to step 914 where a set of four bytes representing a low contrast edge located ¼ of the way across the region for the base luminance value Y1 and the luminance variation ΔY is stored at the array location indexed by the current index value. The current index value is then incremented and the routine proceeds to step 916.

In step 916, a set of four bytes representing a low contrast edge located ½ of the way across the region for the base luminance value Y1 and the luminance variation ΔY is stored at the array location indexed by the current index value. The current index value is then incremented and the routine proceeds, via off-page connectors 924 and 932, to step 934.

In step 934, a set of four bytes representing a low contrast edge located ¾ of the way across the region for the base luminance value Y1 and the luminance variation ΔY is stored at the array location indexed by the current index value. The current index value is then incremented and the routine proceeds to step 936.

Alternatively, if, in step 912, the ΔY value was not valid for low contrast edges, the routine proceeds, via off-page connectors 922 and 930, directly to step 936 and skips steps 914, 916 and 934.

At step 936, the ΔY value is analyzed to determine if it is a valid total luminance variation for a high contrast edge. If it is, the routine proceeds to steps 938, 940 and 942 where four-byte sets representing a high contrast edges located at ¼, ½ and ¾ of the way across the region for the base luminance value Y1 and the luminance variation ΔY are stored at the array locations indexed by three consecutive values of the index variable. After step 942, the current index value is incremented and the routine proceeds to step 944.

If, in step 936, the ΔY value was not valid for high contrast edges the routine proceeds directly to step 944 and skips steps 938–942. At step 944, the variable Y2 is incremented. At step 946, the variable Y2 is checked to determine if it exceeds 63, the maximum permissible high luminance value. If Y2 does not exceed 63, the routine returns, via off-page connectors 928 and 920, to step 906. In step 906, the luminance variation ΔY is adjusted to account for the new value of Y2 and the storage routines are repeated.

If, in step 946, Y2 does exceed 63, the maximum value of the luminance value has been reached and the routine proceeds to step 948 where the base luminance value, Y1, is incremented. A check is performed in step 950 to determine whether the maximum luminance value has been reached. If so, the routine finishes in step 952.

Alternatively, if the new value of the base luminance (Y1) is less than the maximum, the process proceeds, via off-page connectors 926 and 918, to step 904. In step 904, the process is repeated for the new base luminance value.

Naturally, some sort of "tagging" is necessary in the video data stream to indicate to a decoder what form of encoding (one-byte, two-byte, or four-byte) is used. This tagging may be accomplished, for example, by making a byte within an image data stream a tag to indicate the encoding used in four regions. The first two bits of the tag could indicate which type of code follows for the first region, the next two bits of the tag indicate which type of code is used for the second region, and the third and fourth sets of two bits could indicate the type of code used for the third and fourth regions, respectively.

The invention may also compute a "figure of merit" which indicates the amount of compression achieved as it encodes an image or it may compute this figure of merit after the entire image has been encoded. This figure of merit is then used during the comparison process to determine whether further compression, and concomitant threshold adjustment are required.

The foregoing description has been limited to a specific embodiment of this invention. It will be apparent, however, that variations and modifications may be made to the invention, with the attainment of some or all of its advantages. For example, although the preferred embodiment shows the values within the luminance transition array as static or unchanging, these values could be modified on an inter-frame or intra-frame basis.

Further, although the illustrations set forth within the disclosure exhibit square regions, the invention is not limited to the use of square regions. In addition, the bit assignments set forth above in relation to the short (one-byte), medium length (two-byte), and long (four-byte) codes are only meant to provide an illustration of the inventive coding scheme. Codes of other lengths and utilizing other bit assignments are contemplated within the bounds of the invention.

The invention may also be used in combination with other encoding techniques such as convolution encoding. In particular, linear transition coding may be employed, an error value computed, the compression achieved measured and compared with that achieved by another method for that image. The type of encoding which achieves the highest quality for the required compression is then employed for that particular image.

Accordingly, it is the object of the appended claims to cover all such variations and modifications as come within the true spirit and scope of the invention.

What is claimed is:

1. An image processing system which compresses a digitized video image comprising:

A. means for partitioning the image into non-overlapping contiguous regions containing a plurality of pixels each having a unique luminance value indicative of the luminance of its associated pixel; and B. means for compressing the luminance information of pixels in each region by encoding the luminance values within each region into a compressed code, wherein said means for compressing includes:
  1. means for comparing the luminance values of the pixels located along the perimeter of a region to determine a pixel containing the smallest luminance value and its location within the region and for providing a base luminance value indicative of the smallest luminance value;
  2. means for determining direction of greatest luminance change from the base luminance value location;
  3. means for computing a total change in luminance along the direction of greatest luminance change starting from the base luminance value location;
  4. means for selecting a transition function value indicative of the type of luminance transition within the region starting from the location of the base luminance value wherein the luminance transition values are indicative of the following functions:
    a. a linear luminance transition;
    b. a low contrast luminance edge transition at one quarter of the distance across the region;
    c. a low contrast luminance edge transition at one half of the distance across the region;
    d. a low contrast luminance edge transition at three quarters of the distance across the region;
    e. a high contrast luminance edge transition at one quarter of the distance across the region;
    f. a high contrast luminance edge transition at one half of the distance across the region; and
    g. a high contrast luminance edge transition at three quarters of the distance across the region; and
  5. means for generating a digitized encoded data stream containing encoded data indicative of the direction of greatest luminance change and an index value representative of the luminance characteristics within the region, wherein the index value is selected as a function of the base luminance value, the direction of greatest luminance change, the total change in luminance value, and the transition function value wherein said means for generating a digitized encoded data stream, further comprises:
    means for generating a short code of compressed video image data comprising i) $M_1$ number of bits indicative of the direction of greatest luminance change, and ii) $M_2$ number of bits indicative of the base luminance value;
    means for generating a medium length code of compressed video image data comprising i) $M_3$ number of bits indicative of the direction of greatest luminance change, ii) $M_4$ number of bits indicative of an index value which is a pointer to an array containing encoded luminance information; and
    means for providing said encoded data stream as said short length code when the value of total variation in luminance is less than a first threshold value, and for providing said encoded data stream as said medium length code when the value of the total variation in luminance is not less then the first threshold value.

2. The system of claim 1 wherein:
A. the linear luminance transition exhibits equal luminance steps across the region;
B. the low contrast luminance edge transition exhibits unequal luminance steps across the region, the luminance edge transition being characterized by a variation in luminance along a line perpendicular to the direction to greatest luminance change across the region, the diffuse nature of which is represented by an error diffusion distribution in the direction to greatest luminance change across the region; and
C. the high contrast luminance edge transition exhibits unequal luminance steps across the region, the luminance edge transition being characterized by a relatively sharp variation in luminance along a line perpendicular to the direction of greatest luminance change across the region.

3. The image processing apparatus of claims 1, wherein the codes are predetermined but may change from image to image or within a given image.

4. The image processing apparatus of claim 1, wherein the system includes conversion equipment to convert video signals from a three-color or composite-video format to a luminance, chrominance video format.

5. A method of compressing the amount of data required to represent the luminance information of a digitized image which is represented in a luminance chrominance format, comprising the steps:
A. partitioning the image into non-overlapping contiguous regions each containing a plurality of luminance values and selecting a region for processing;
B. determining a base luminance value from luminance values located along the perimeter of the region and determining a base luminance location indicative of the location of the base luminance value in the region;
C. determining a direction in the region having a greatest luminance change from the base luminance location;
D. determining a total change in luminance within the region by determining the largest luminance difference between the base luminance value and the remaining luminance values in the region;
E. determining a type of luminance transition within the region from the location of the base luminance value, and selecting a luminance transition function value indicative of the type of luminance transition from a set of possible luminance transition functions; and
F. encoding the luminance information for the region based on the base luminance value, the total change in luminance, the direction of greatest luminance change, and the luminance transition function value indicative of the type of luminance transition within the region, and providing an encoded image signal, wherein the step of encoding further comprises the steps of:
  a. encoding the region's luminance data in a short code consisting of two bits which indicate the direction of greatest luminance change within the region and six bits which indicate the region's base luminance value when the total change in luminance throughout the region is less than a first threshold value; and
  b. encoding the region's luminance data in a medium-length code consisting of four bits which indicate the direction of greatest luminance change within the region and twelve bits indicative of the an index value which is a pointer to a luminance transition array containing encoded region luminance information, when the total change in luminance across the region is not less than the first threshold value.

6. The method of compressing of claim 5 wherein the luminance transition array contains data which does not vary from image to image or from region to region within an image.

7. The method of compressing of claim 5 further comprising employing a predetermined set of transition functions which are modified between images or from region to region within an image.

8. An image processing system which compresses a digitized video image comprising:

A. means for partitioning the image into non-overlapping contiguous regions containing a plurality of pixels each having a unique luminance value indicative of the luminance of its associated pixel; and B. means for compressing the luminance information of pixels in each region by encoding the luminance values within each region into a compressed code, wherein said means for compressing includes
  1. means for comparing the luminance values of the pixels located along the perimeter of a region to determine a pixel containing the smallest luminance value and its location within the region, and for providing a base luminance value indicative of the smallest luminance value;
  2. means for determining a direction of greatest luminance change from the base luminance value location;
  3. means for computing a total change in luminance along the direction of greatest luminance change starting from the base luminance value location;
  4. means for selecting a transition function value indicative of the type of luminance transition within the region starting from the location of the base luminance value; and
  5. means for generating a digitized encoded data stream containing encoded data indicative of the direction of greatest luminance change and an index value representative of the luminance characteristics within the region, wherein the index value is selected as a function of the base luminance value, the direction of greatest luminance change, the total change in luminance value, and the transition function value, wherein said means for generating a digitized encoded data stream, further comprises:
    means for generating a short code of compressed video image data comprising i) two bits indicative of the direction of greatest luminance change, and ii) six bits indicative of the base luminance value;
    means for generating a medium length code of compressed video image data comprising i) four bits indicative of the direction of greatest luminance change, ii) twelve bits indicative of an index value which is a pointer to an array containing encoded luminance information; and
    means for providing said encoded data stream as said short length code when the value of total variation in luminance is less than a first threshold value, and for providing said encoded data stream as said medium length code when the value of the total variation in luminance is not less then the first threshold value.

9. An image processing system which compresses a digitized video image, the image processing system comprising:

A means for partitioning the image into non-overlapping contiguous regions containing a plurality of pixels each having a unique luminance value indicative of the luminance of its associated pixel; and B. means for compressing the luminance information of pixels in each region by encoding the luminance values within each region into a compressed code, wherein said means for compressing includes
  1. means for comparing the luminance values of the pixels located along the perimeter of a region to determine a pixel containing the smallest luminance value and its location within the region, and for providing a base luminance value indicative of the smallest luminance value;
  2. means for determining a direction of greatest luminance change from the base luminance value location;
  3. means for computing a total change in luminance along the direction of greatest luminance change starting from the base luminance value location;
  4. means for selecting a transition function value indicative of the type of luminance transition within the region starting from the location of the base luminance value; and
  5. means for generating digitized encoded data stream containing encoded data indicative of the direction of greatest luminance change and an index value representative of the luminance characteristics within the region, wherein the index value is selected as a function of the base luminance value, the direction of greatest luminance change, the total change in luminance value, and the transition function value wherein said means for generating a digitized encoded data stream, further comprises:
    means for generating a short code of compressed video image data comprising i) $M_1$ number of bits indicative of the direction of greatest luminance change, and ii) $M_2$ number of bits indicative of the base luminance value;
    means for generating a medium length code of compressed video image data comprising i) $M_3$ number of bits indicative of the direction of greatest luminance change, ii) $M_4$ number of bits indicative of an index value which is a pointer to an array containing encoded luminance information; and
    means for providing said encoded data stream as said short length code when the value of total variation in luminance is less than a first threshold value, and for providing said encoded data stream as said medium length code when the value of the total variation in luminance is not less then the first threshold value wherein said means for generating a digitized encoded data stream, further comprises means for generating a long length code of four bytes of compressed image data.

10. A method of compressing the amount of data required to represent the luminance information of a digitized image which is represented in a luminance chrominance format, comprising the steps:

A. partitioning the image into non-overlapping contiguous regions each containing a plurality of luminance values and selecting a region for processing;

B. determining a base luminance value from luminance values located along the perimeter of the region and determining a base luminance location indicative of the location of the base luminance value in the region said selecting a base luminance value step comprising the steps of:

a. comparing the luminance values of all the pixels located on the perimeter of the region;
b. determining the pixel with a smallest luminance value based on the comparison step; and
c. assigning the smallest luminance value to the base luminance value;

C. determining a direction in the region having a greatest luminance change from the base luminance location;

D. determining a total change in luminance within the region by determining the largest luminance difference between the base luminance value and the remaining luminance values in the region;

E. determining a type of luminance transition within the region from the location of the base luminance value, and selecting a luminance transition function value indicative of the type of luminance transition from a set of possible luminance transition functions; and F. encoding the luminance information for the region based on the base luminance value, the total change in luminance, the direction of greatest luminance change, and the luminance transition function value indicative of the type of luminance transition within the region, and providing an encoded image signal wherein the step of encoding further comprises the steps of:
  a. computing a plurality of average luminance values each representative of the average luminance for an associated one of a plurality of pixel lines which each run within the region in a direction perpendicular to the direction of greatest luminance change;
  b. for each of the possible luminance transition functions each having a unique luminance transition function value
    1) adding the base luminance value to the total change in luminance value, and adding to a resultant sum the luminance transition function value to form a look-up table value;
    2) retrieving from an array, as a function of the look-up table value, a plurality of test compression values;
    3) generating an error value indicative of the luminance difference between a test compressed region, as characterized by the test compression values, and the original uncompressed region;
  c. comparing each of the error values with one another to determine a smallest error value; and
  d. identifying a selected luminance transition function value associated with the smallest error value.

11. The method of claim 10 wherein following the step of comparing each of the error values to determine the smallest error value, the method of compressing performs a step of comparing the smallest error value against a predetermined quality threshold value to determine if sufficient image quality has been retained in the encoded image signal.

12. The method of claim 11 wherein if the smallest error value is less than the predetermined quality threshold value, the encoded image signal is encoded as a two byte signal.

13. The method of claim 12 wherein if the lowest error value is not less than the predetermined quality threshold value, the encoded signal is encoded as a four byte signal.

14. A method of compressing the amount of data required to represent the luminance information of a digitized image which is represented in a luminance chrominance format, comprising the steps of:
A. partitioning the image into non-overlapping contiguous regions each containing a plurality of luminance values and selecting a region for processing;

B. determining a base luminance value from luminance values located along the perimeter of the region and determining a base luminance location indicative of the location of the base luminance value in the region;

C. determining a direction in the region having a greatest luminance change from the base luminance location;

D. determining a total change in luminance within the region by determining the largest luminance difference between the base luminance value and the remaining luminance values in the region;

E. determining a type of luminance transition within the region from the location of the base luminance value, and selecting a luminance transition function value indicative of the type of luminance transition from a set of possible luminance transition functions; and F. encoding the luminance information for the region based on the base luminance value, the total change in luminance, the direction of greatest luminance change, and the luminance transition function value indicative of the type of luminance transition within the region, and providing an encoded image signal wherein said encoding step further comprises the steps of:
  1. encoding the region's luminance data in a short code consisting of m1 number bits which indicate the direction of greatest luminance change within the region and m2 number of bits which indicate the region's base luminance value when the total change in luminance throughout the region is less than a first threshold value; and
  2. encoding the region's luminance data in a medium-length code consisting of m3 number of bits which indicate the direction of greatest luminance change within the region and m4 number of bits indicative of an index value which is a pointer to a luminance transition array containing encoded region luminance information, when the total change in luminance across the region is not less than the first threshold value and further comprising the step of encoding the region's luminance data in a long length code comprising several bits indicative of the direction of greatest luminance change within the region, and a plurality of bits indicative of at least four luminance values which together characterize the luminance transition within the region when the total change in luminance across the region is not less than both the first threshold value and a second threshold value.

15. A method of compressing the amount of data required to represent the luminance information of a digitized image which is represented in a luminance chrominance format, comprising the steps:
A. partitioning the image into non-overlapping contiguous regions each containing a plurality of luminance values and selecting a region for processing;

B. determining a base luminance value from luminance values located along the perimeter of the region and determining a base luminance location indicative of the location of the base luminance value in the region;

C. determining a direction in the region having a greatest luminance change from the base luminance location;

D. determining a total change in luminance within the region by determining the largest luminance difference between the base luminance value and the remaining luminance values in the region;

E. determining a type of luminance transition within the region from the location of the base luminance value, and selecting a luminance transition function value indicative of the type of luminance transition from a set of possible luminance transition functions; and F. encoding the luminance information for the region based on the base luminance value, the total change in luminance, the direction of greatest luminance change, and the luminance transition function value indicative of the type of luminance transition within the region, and providing an encoded image signal wherein the set of possible luminance transition functions comprises transition functions representative of:

1. a linear luminance transition;
2. a low contrast luminance edge transition at one quarter of the distance across the region;
3. a low contrast luminance edge transition at one half of the distance across the region;
4. a low contrast luminance edge transition at three quarters of the distance across the region;
5. a high contrast luminance edge transition at one quarter of the distance across the region;
6. a high contrast luminance edge transition at one half of the distance across the region; and
7. a high contrast luminance edge transition at three quarters of the distance across the region.

* * * * *